(12) United States Patent
Zhao et al.

(10) Patent No.: US 11,899,203 B1
(45) Date of Patent: Feb. 13, 2024

(54) METHOD FOR OUT-COUPLING GRATING FOR AR OPTICAL WAVEGUIDE, AND DESIGN METHOD FOR AR OPTICAL WAVEGUIDE

(71) Applicant: JIAXING UPHOTON OPTOELECTRONICS TECHNOLOGY CO., LTD., Jiaxing (CN)

(72) Inventors: Xingming Zhao, Jiaxing (CN); Zhentao Fan, Jiaxing (CN); Qingfeng Zhu, Jiaxing (CN); Lei Sui, Jiaxing (CN); Kehan Tian, Jiaxing (CN)

(73) Assignee: JIAXING UPHOTON OPTOELECTRONICS TECHNOLOGY CO., LTD., Tongxiang (CN)

( * ) Notice: Subject to any disclaimer, the term of this patent is extended or adjusted under 35 U.S.C. 154(b) by 0 days.

(21) Appl. No.: 18/549,215

(22) PCT Filed: Jun. 16, 2022

(86) PCT No.: PCT/CN2022/099095
§ 371 (c)(1),
(2) Date: Sep. 6, 2023

(87) PCT Pub. No.: WO2023/284478
PCT Pub. Date: Jan. 19, 2023

(30) Foreign Application Priority Data

Jul. 15, 2021 (CN) .......................... 202110798760.1

(51) Int. Cl.
*G02B 27/00* (2006.01)
*G02B 5/18* (2006.01)
(Continued)

(52) U.S. Cl.
CPC ....... *G02B 27/0012* (2013.01); *G02B 5/1847* (2013.01); *G02B 6/0016* (2013.01);
(Continued)

(58) Field of Classification Search
USPC ............................................................ 345/8
See application file for complete search history.

(56) References Cited

U.S. PATENT DOCUMENTS

| 11,662,584 B2 * | 5/2023 | Lee ..................... G02B 27/0172 359/630 |
| 2001/0046087 A1 * | 11/2001 | Hoose .................. G02B 5/1814 359/566 |

(Continued)

FOREIGN PATENT DOCUMENTS

| CN | 109239920 A | 1/2019 |
| CN | 109901298 A | 6/2019 |

(Continued)

OTHER PUBLICATIONS

China Search Report dated Jul. 15, 2021 from China Application No. 202110798760.1.
(Continued)

*Primary Examiner* — Chineyere D Wills-Burns
(74) *Attorney, Agent, or Firm* — INNOVATION CAPITAL LAW GROUP, LLP; Vic Lin (57) ABSTRACT

The disclosure provides a design method of a coupling-out grating and the design method including: calculating a diffraction coupling-in angle, at which a light beam is diffracted and coupled into the optical waveguide body through the coupling-in grating, according to an angle at which the light beam is incident to the coupling-in grating, a wavelength of the light beam and a grating period of the coupling-in grating; calculating a distance between two adjacent coupling-out positions of the light beam; calculat-
(Continued)

ing a brightness difference rate of the light beam after being coupled out multiple times through the coupling-out grating according to the maximum diffraction efficiency of the coupling-out grating; and calculating the number of partitions of the coupling-out grating according to a length of the coupling-out grating, a sensitivity of a human eye to the light beam, the brightness difference rate, and the distance between the two adjacent coupling-out positions.

20 Claims, 9 Drawing Sheets

(51) Int. Cl.
 *F21V 8/00* (2006.01)
 *G02B 27/01* (2006.01)
(52) U.S. Cl.
 CPC ......... *G02B 6/0036* (2013.01); *G02B 6/0065* (2013.01); *G02B 27/0172* (2013.01); *G02B 2027/0178* (2013.01)

(56) References Cited

U.S. PATENT DOCUMENTS

| | | | |
|---|---|---|---|
| 2006/0066948 A1* | 3/2006 | Mizuyama | G11B 7/1353 359/569 |
| 2010/0142892 A1* | 6/2010 | Kuittinen | G02B 6/34 385/37 |
| 2011/0038034 A1* | 2/2011 | Kashyap | G02F 1/3775 359/328 |
| 2015/0219842 A1* | 8/2015 | Sqalli | B29D 11/00692 264/1.24 |
| 2016/0299347 A1* | 10/2016 | Petrov | G02B 5/1861 |
| 2019/0041634 A1* | 2/2019 | Popovich | G02B 6/00 |
| 2019/0101681 A1* | 4/2019 | Meng | G02B 6/0031 |
| 2019/0302024 A1* | 10/2019 | Sun | G01N 21/0303 |
| 2021/0063765 A1* | 3/2021 | Yang | H04N 13/337 |
| 2021/0181515 A1* | 6/2021 | Ellenbogen | G02B 27/0172 |
| 2021/0223461 A1* | 7/2021 | Ma | G02B 27/0172 |
| 2021/0405289 A1* | 12/2021 | Nakamura | G02B 6/12033 |
| 2022/0099898 A1* | 3/2022 | Waldern | G02B 27/0172 |

FOREIGN PATENT DOCUMENTS

| | | |
|---|---|---|
| CN | 110543022 A | 12/2019 |
| CN | 111103655 A | 5/2020 |
| CN | 111679361 A | 9/2020 |
| CN | 113009690 A | 6/2021 |
| CN | 113625446 A | 11/2021 |
| CN | 113625447 A | 11/2021 |

OTHER PUBLICATIONS

International Search Report dated Jul. 28, 2022 from PCT Application No. PCT/CN2022/099095.

* cited by examiner

```
┌─────────────────────────────────────────┐
│  optimizing grating parameters of the   │
│ coupling-in grating according to an     │
│ angle at which a light beam is incident │── S101
│ to the coupling-in grating and a        │
│ wavelength of the light beam, the       │
│ grating parameters including a grating  │
│ period, a grating depth and a grating   │
│ duty ratio                              │
└─────────────────────────────────────────┘
                    │
┌─────────────────────────────────────────┐
│ determining a grating period and a      │
│ grating depth of the coupling-out       │── S102
│ grating according to the grating period │
│ and the grating depth of the coupling-in│
│ grating                                 │
└─────────────────────────────────────────┘
                    │
┌─────────────────────────────────────────┐
│   partitioning the coupling-out grating │── S103
└─────────────────────────────────────────┘
                    │
┌─────────────────────────────────────────┐
│ obtaining grating duty ratios of        │
│ respective partitions of the coupling-  │── S104
│ out grating by taking a total coupling- │
│ out optical power and non-uniformity of │
│ the coupling-out grating as optimization│
│ objectives                              │
└─────────────────────────────────────────┘
```

| | |
|---|---|
| calculating a diffraction coupling-in angle, at which the light beam is diffracted and coupled into the optical waveguide body through the coupling-in grating, according to an angle at which the light beam is incident to the coupling-in grating, a wavelength of the light beam and a grating period of the coupling-in grating | S1031 |
| calculating a distance between two adjacent coupling-out positions of the light beam on the coupling-out grating according to the diffraction coupling-in angle and a thickness of the optical waveguide body | S1032 |
| calculating a brightness difference rate of the light beam after being coupled out multiple times through the coupling-out grating according to the maximum diffraction efficiency of the coupling-out grating | S1033 |
| calculating the number of partitions of the coupling-out grating according to a length of the coupling-out grating, a sensitivity of a human eye to the light beam, the brightness difference rate, and the distance between the two adjacent coupling-out positions | S1034 |

METHOD FOR OUT-COUPLING GRATING FOR AR OPTICAL WAVEGUIDE, AND DESIGN METHOD FOR AR OPTICAL WAVEGUIDE

TECHNICAL FIELD

The disclosure generally relates to the technical field of near-eye display, and, in particular, to a design method of a coupling-out grating of an AR optical waveguide, and a design method of an AR optical waveguide.

BACKGROUND

With the development of computer technologies and display technologies, the virtual reality (VR) technology for experiencing a virtual world by using a computer simulation system, and the augmented reality (AR) technology and the mixed reality (MR) technology for integrating the display content into a real environmental background have been developed rapidly.

Near-eye display is a key technical focus in the development of the VR, AR, and MR technologies mentioned above. The VR technology of the near-eye display mainly pursues a virtual display of an immersive large field of view, which corresponds to a virtual reality display helmet. The purpose of the near-eye AR and MR technologies is to implement a perspective virtual-real fusion, which corresponds to augmented reality smart glasses.

Currently, a geometric optical solution of a free curved surface is usually adopted in a near-eye display apparatus for the AR/MR, but there is a limitation on the size thereof, restricting the promotion of AR/MR glasses; and array optical waveguides and diffractive optical waveguides gradually appear in the field of view. The design principle of an array optical waveguide is relatively simple, but the process is relatively difficult and is not suitable for mass production. Furthermore, since an array optical waveguide needs to be collocated with a specific optical machine, the mass promotion thereof is also restricted.

A diffractive optical waveguide, as an augmented reality optical engine, implements functions such as coupling-in, coupling-out, and pupil dilation of an image. The diffractive optical waveguide is advantageous in high mass production, lightness and thinness, and other aspects, which is gradually recognized in the AR/MR field, and serves as a mainstream technical trend in the AR/MR field in the future. However, a phenomenon of nonuniform brightness of an image may usually appear in the field of view of a wearer of AR/MR glasses using a diffractive optical waveguide.

The contents in the Background are only technologies known by the disclosers, and do not necessarily represent the existing technology in the field.

SUMMARY

In view of at least one of the defects in the existing technology, the disclosure provides a design method of a coupling-out grating of an AR optical waveguide, the AR optical waveguide including a coupling-in grating, an optical waveguide body and the coupling-out grating, and the design method characterized by including:

S101: calculating a diffraction coupling-in angle, at which a light beam is diffracted and coupled into the optical waveguide body through the coupling-in grating, according to an angle at which the light beam is incident to the coupling-in grating, a wavelength of the light beam and a grating period of the coupling-in grating;

S102: calculating a distance between two adjacent coupling-out positions of the light beam on the coupling-out grating according to the diffraction coupling-in angle and a thickness of the optical waveguide body;

S103: calculating a brightness difference rate of the light beam after being coupled out multiple times through the coupling-out grating according to the maximum diffraction efficiency of the coupling-out grating; and S104: calculating the number of partitions of the coupling-out grating according to a length of the coupling-out grating, a sensitivity of a human eye to the light beam, the brightness difference rate, and the distance between the two adjacent coupling-out positions.

According to an aspect of the disclosure, wherein the light beam is incident as a conical light beam with a certain field angle, step S101 further including:

calculating the diffraction coupling-in angle according to a central incident angle of the conical light beam or a positive/negative extreme value of an incident angle of the conical light beam.

The disclosure further provides a design method of an AR optical waveguide, the AR optical waveguide including a coupling-in grating, an optical waveguide body, and a coupling-out grating, and the design method characterized by including:

S201: optimizing grating parameters of the coupling-in grating according to an angle at which a light beam is incident to the coupling-in grating and a wavelength of the light beam, the grating parameters including a grating period, a grating depth and a grating duty ratio;

S202: determining a grating period and a grating depth of the coupling-out grating according to the grating period and the grating depth of the coupling-in grating;

S203: partitioning the coupling-out grating by employing the design method described above; and S204: obtaining grating duty ratios of respective partitions of the coupling-out grating by taking a total coupling-out optical power and non-uniformity of the coupling-out grating as optimization objectives.

According to an aspect of the disclosure, step S201 further includes:

S2011: determining optimization ranges of the grating parameters according to initial grating parameters and the wavelength of the light beam;

S2012: calculating diffraction efficiencies at different coupling-in angles according to a maximum diffraction coupling-in angle and a set coupling-in angle step length;

S2013: calculating a mean diffraction efficiency and a non-uniformity parameter of the coupling-in grating according to the diffraction efficiencies at different coupling-in angles; and S2014: obtaining an optimized grating period, modulation depth, and duty ratio of the coupling-in grating by taking the mean diffraction efficiency and the non-uniformity parameter as optimization objectives.

According to an aspect of the disclosure, step S2014 further includes:

performing optimization by employing a steepest descent method, genetic algorithm, particle swarm optimization or simulated annealing algorithm.

According to an aspect of the disclosure, step S202 further includes:

designing the coupling-out grating to have a grating depth and grating period consistent with those of the coupling-in grating.

According to an aspect of the disclosure, step S204 further includes:

S2041: dividing an eyebox of the coupling-out grating into a plurality of sub-eyeboxes according to a pupil size, and calculating coupling-out optical powers of respective sub-eyeboxes;

S2042: calculating a non-uniformity parameter of the coupling-out optical powers within the eyebox of the coupling-out grating according to the coupling-out optical powers of the respective sub-eyeboxes;

S2044: obtaining optimized grating duty ratios of the respective partitions by taking the total coupling-out optical power and the non-uniformity parameter of the coupling-out grating as optimization objectives.

According to an aspect of the disclosure, step S2044 further includes:

performing optimization by employing a steepest descent method, genetic algorithm, particle swarm optimization or simulated annealing algorithm.

The disclosure further provides an optical waveguide for AR glasses, which is designed and manufactured by employing the design method described above.

A preferred embodiment of the disclosure provides a design method of a coupling-out grating of an AR optical waveguide. According to the parameters of the coupling-out grating and the optical waveguide, and the degree of sensitivity of a human eye to the brightness of a light beam, the coupling-out grating is partitioned, such that the human eye does not easily perceive a change in brightness in one and the same partition. As for different partitions, grating duty ratios in respective partitions are optimized, such that the coupling-out diffraction efficiencies of the respective partitions are different, thereby improving the situation where an image transmitted through the AR optical waveguide exhibits a change in brightness in the field of view of the wearer. A preferred embodiment of the disclosure further provides a design method of an AR optical waveguide. Various grating parameters of a coupling-in grating are optimized, such that the diffraction efficiencies of light beams coupled into the optical waveguide at different angles are close to each other. Within an eyebox of the coupling-out grating, grating duty ratios are optimized, such that the diffraction efficiencies of respective sub-eyeboxes are uniform, thereby further improving the situation of the non-uniformity in brightness of the displayed image as described above.

BRIEF DESCRIPTION OF THE DRAWINGS

The drawings are used to provide a further understanding of the present disclosure and constitute a part of the specification, and are used to explain the present disclosure along with the embodiments of the present disclosure, but do not constitute any limitation to the disclosure. In the drawings.

DETAILED DESCRIPTION

Only certain exemplary embodiments will be briefly described below. As those skilled in the art will recognize, the described embodiments may be modified in various different ways without departing from the spirit or scope of the present disclosure. Therefore, the drawings and the following description are deemed essentially exemplary, and not limitative.

In the description of the present disclosure, it needs to be understood that the orientation or position relations denoted by such terms as "central" "longitudinal" "latitudinal" "length" "width" "thickness" "above" "below" "front" "rear" "left" "right" "vertical" "horizontal" "top" "bottom" "inside" "outside" "clockwise" "counterclockwise" and the like are based on the orientation or position relations as shown in the accompanying drawings, and are used only for the purpose of facilitating description of the present disclosure and simplification of the description, instead of indicating or suggesting that the denoted devices or elements must be oriented specifically, or configured or operated in a specific orientation. Thus, such terms should not be construed to limit the present disclosure. In addition, such terms as "first" and "second" are only used for the purpose of description, rather than indicating or suggesting relative importance or implicitly indicating the number of the denoted technical features. Accordingly, features defined with "first" and "second" may, expressly or implicitly, include one or more of the features. In the description of the present disclosure, "plurality" means two or more, unless otherwise defined explicitly and specifically.

In the description of the present disclosure, it needs to be noted that, unless otherwise specified and defined explicitly, such terms as "installation" "coupling" and "connection" should be broadly understood as, for example, fixed connection, detachable connection, or integral connection; or mechanical connection, electrical connection or intercommunication; or direct connection, or indirect connection via an intermediary medium; or internal communication between two elements or interaction between two elements. For those skilled in the art, the specific meanings of such terms herein can be construed in light of the specific circumstances.

Herein, unless otherwise specified and defined explicitly, if a first feature is "on" or "beneath" a second feature, this may cover direct contact between the first and second features, or contact via another feature therebetween, other than the direct contact. Furthermore, if a first feature is "on", "above", or "over" a second feature, this may cover the case that the first feature is right above or obliquely above the second feature, or just indicate that the level of the first feature is higher than that of the second feature. If a first feature is "beneath", "below", or "under" a second feature, this may cover the case that the first feature is right below or obliquely below the second feature, or just indicate that the level of the first feature is lower than that of the second feature.

The disclosure below provides many different embodiments or examples so as to realize different structures described herein. In order to simplify the disclosure herein, the following will give the description of the parts and arrangements embodied in specific examples. Of course, they are only for the exemplary purpose, not intended to limit the present disclosure. Besides, the present disclosure may repeat a reference number and/or reference letter in different examples, and such repeat is for the purpose of simplification and clarity, which does not represent any relation among various embodiments and/or arrangements as discussed. In addition, the present disclosure provides examples of various specific processes and materials, but those skilled in the art can also be aware of application of other processes and/or use of other materials.

The embodiments of the present disclosure will be described below with reference to the drawings. It should be appreciated that the embodiments described herein are only used to illustrate and explain the present disclosure, but not to limit the present disclosure.

Figure 1:
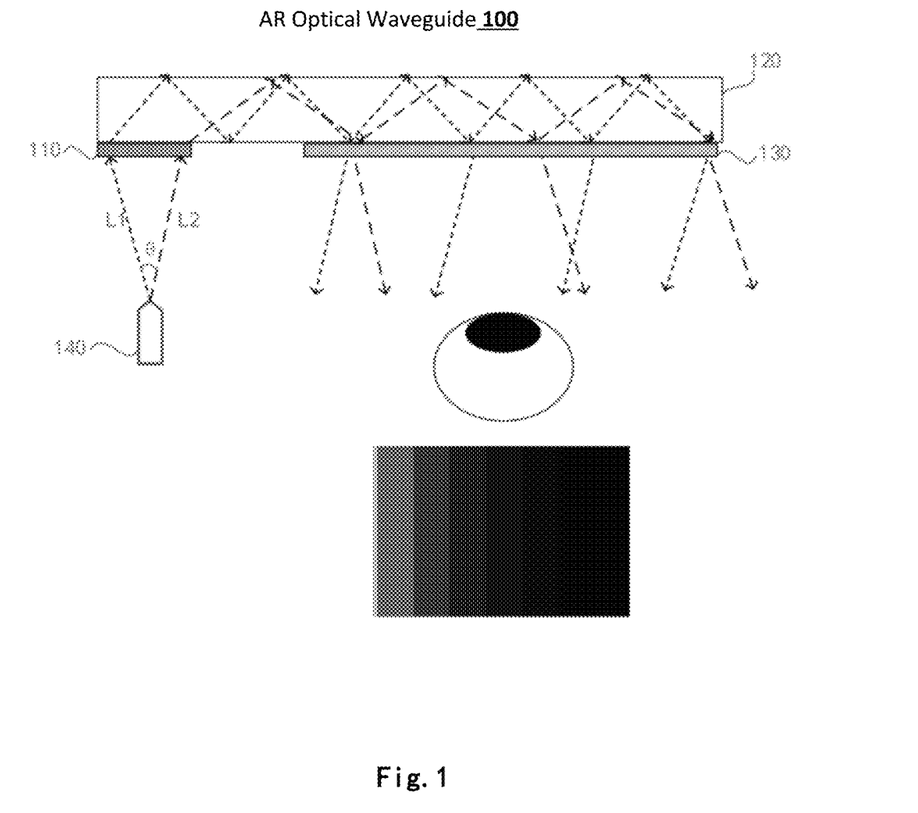
FIG. 1 illustrates an AR optical waveguide in accordance with a preferred embodiment of the disclosure.

As shown in FIG. 1, an AR optical waveguide 100 includes a coupling-in grating 110, an optical waveguide body 120 and a coupling-out grating 130. The AR optical waveguide 100 is provided with an incident light beam by an optical machine 140, which is configured to form a light beam group distributed in a light cone. Light beams in different directions in the light beam group, for example, may carry color information and/or brightness information about different image pixels.

As shown in FIG. 1, the optical machine 140 generates a light beam group distributed in a light cone with a divergence angle of $\theta$, wherein diffraction efficiencies of light beams coupled into the AR optical waveguide 100 at different angles are different; and as the light beams are continuously coupled and emitted in the transmission course, the light flux within an eyebox would gradually decrease, which results that a phenomenon of a change in brightness appears in an image observed when a human eye moves within the eyebox.

Figure 2:
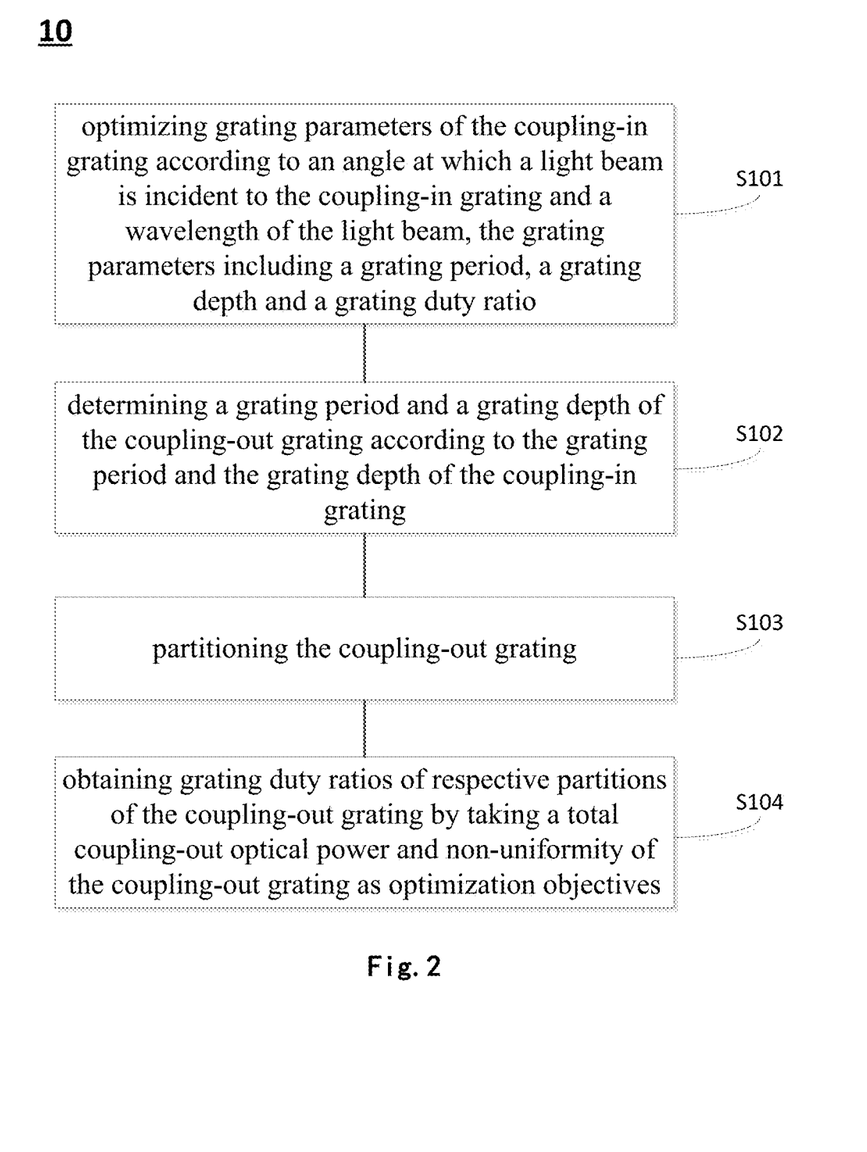
FIG. 2 illustrates a design method of an AR optical waveguide in accordance with a preferred embodiment of the disclosure.

In order to solve the aforesaid technical problem, the disclosure provides a design method 10 of an AR optical waveguide. In accordance with a preferred embodiment of the disclosure, as shown in FIG. 1, the AR optical waveguide 100 includes a coupling-in grating 110, an optical waveguide body 120 and a coupling-out grating 130. FIG. 2 illustrates a flowchart of the design method 10, including steps S101-S104, wherein:

In step S101, grating parameters of the coupling-in grating 110 are optimized according to an angle at which a light beam is incident to the coupling-in grating 110 and a wavelength of the light beam, the grating parameters including a grating period, a grating depth and a grating duty ratio.

Figure 3:
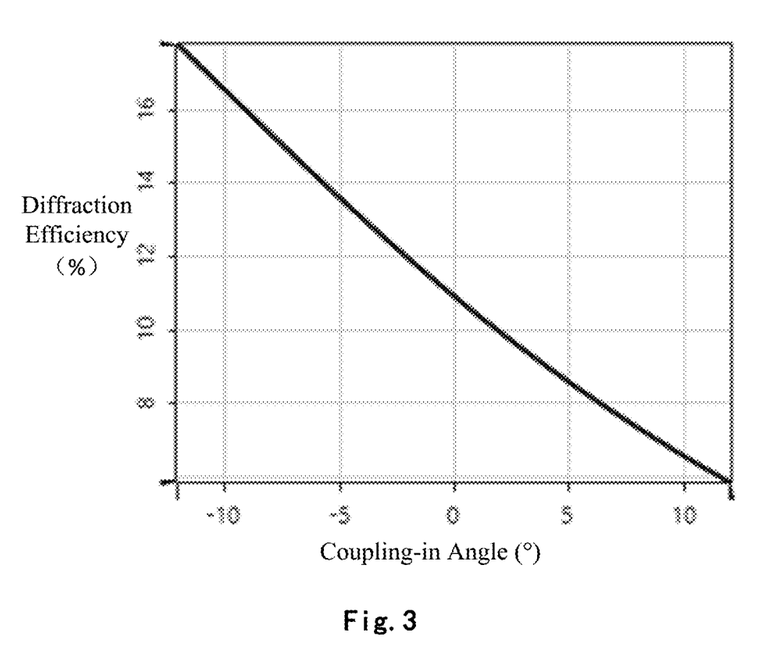
FIG. 3 illustrates a function of a diffraction efficiency of a coupling-in grating with respect to a coupling-in angle.

For example, the coupling-in grating 110 is designed for the +1st order diffraction, i.e., the +1st order diffracted light is propagated by total reflection after being coupled into the optical waveguide body 120 through the coupling-in grating 110. However, the diffraction efficiency of the +1st order diffraction is not symmetrical about 0°, i.e., the diffraction efficiencies of the light beams coupled into the AR optical waveguide 100 at different angles are different. FIG. 3 illustrates a function of the diffraction efficiencies with respect to different coupling-in angles in the +1st order diffraction. As shown in FIG. 1, a light beam L1 generated by the optical machine 140 is coupled into the AR optical waveguide 100 at an angle of −10°, and a light beam L2 generated by the optical machine 140 is coupled into the AR optical waveguide 100 at an angle of 10° C. As can be known from FIG. 3, the +1st order diffraction efficiency of the light beam L1 is 16.8%, and the +1st order diffraction efficiency of the light beam L2 is 6.5%. In the case that the coupling-in grating 110 is not optimized, after the light beams L1 and L2 are propagated through the optical waveguide body 120 and are coupled out by the coupling-out grating 130, due to the light loss caused by the difference in the +1st order diffraction efficiencies of the light beams coupled in at different angles, the brightness of image information transmitted by the light beam L1, as observed by a human eye, is obviously greater than the brightness of image information transmitted by the light beam L2.

The +1st order diffraction efficiency of the coupling-in grating 110 is related to the wavelength of a coupling-in light beam and the coupling-in angle of the light beam. Therefore, in step S101, the grating parameters of the coupling-in grating 110 are optimized first according to the angle at which the light beam is incident to the coupling-in grating 110 and the wavelength of the light beam, and the optimized parameters include the grating period, the grating depth and the grating duty ratio. By means of the optimized coupling-in grating 110, the +1st order diffraction efficiencies of light beams coupled into the AR optical waveguide 100 at different angles can be relatively uniform; meanwhile, the light extraction efficiency of the coupling-in grating 110 is also taken into account, i.e., a mean diffraction efficiency of the coupling-in grating 110.

Step S101 of the design method 10 overcomes or ameliorates the problem about different imaging brightnesses in different fields of view caused by different diffraction efficiencies of light beams coupled into the AR optical waveguide 100 at different angles, such that an image observed by a human eye is relatively uniform in brightness after the light beams emitted by the optical machine 140 are coupled in by the coupling-in grating 110, propagated through the optical waveguide body 120 by total reflection, and then coupled out by the coupling-out grating 130.

In step S102, the grating period and the grating depth of the coupling-out grating 130 are determined according to the grating period and the grating depth of the coupling-in grating 110.

Through step S101, the grating parameters of the coupling-in grating 110 can be determined, and then the grating period and the grating depth of the coupling-out grating 130 are determined according to the grating period and the grating depth of the coupling-in grating 110. If the grating period of the coupling-in grating 110 is set to be the same as that of the coupling-out grating 130, the light beam L1 generated by the optical machine 140 is coupled into the coupling-in grating 110 of the AR optical waveguide 100 at an incident angle of, for example, −10°, and is coupled out from the AR optical waveguide 100 by the coupling-out grating 130 still at an emergence angle of −10° after being propagated through the optical waveguide body 120. Furthermore, the grating depth of the coupling-in grating 110 is set to be the same as that of the coupling-out grating 130, and this is friendly to the process and convenient for processing and manufacturing; and in the course of grating stamping and etching, etching aspect ratios meeting one and the same standard are adopted, such that the etching process difficulty is reduced.

In step S103, the coupling-out grating 130 is partitioned.

As shown in FIG. 1, the light beams L1 and L2 are propagated in the optical waveguide body 120 of the AR optical waveguide 100 by total reflection, and as the light beams L1 and L2 are continuously coupled and emitted within the range of the region where the coupling-out grating 130 is located, if the diffraction efficiency of the coupling-out grating 130 is constant, the brightness of the light beams L1 and L2 is continuously reduced. This is also one of the reasons why an image with a change in brightness appears in the field of view of an observer using AR/MR glasses with a diffractive optical waveguide. In a preferred embodiment of the disclosure, according to the sensitivity of a human eye to a light beam change, a coupling-out region corresponding to the coupling-out grating 130 is partitioned, and the same grating parameters are set in one and the same partition, where a human eye does not perceive the attenuation of brightness. In different partitions, light extraction efficiencies (diffraction efficiencies) of the light beam are made different by adjusting the grating parameters, and after each attenuation, the diffraction efficiencies increase, and thus the brightness change of the light beam is not obvious. The partition method of the coupling-out grating will be described below in detail.

In step S104, grating duty ratios of respective partitions of the coupling-out grating are obtained by taking a total coupling-out optical power and non-uniformity of the coupling-out grating as optimization objectives.

A grating partition of the coupling-out grating 130 is determined by means of step S103, and a grating duty ratio in each partition is determined by taking a total coupling-out optical power and non-uniformity within the eyebox as optimization objectives.

Figure 4:
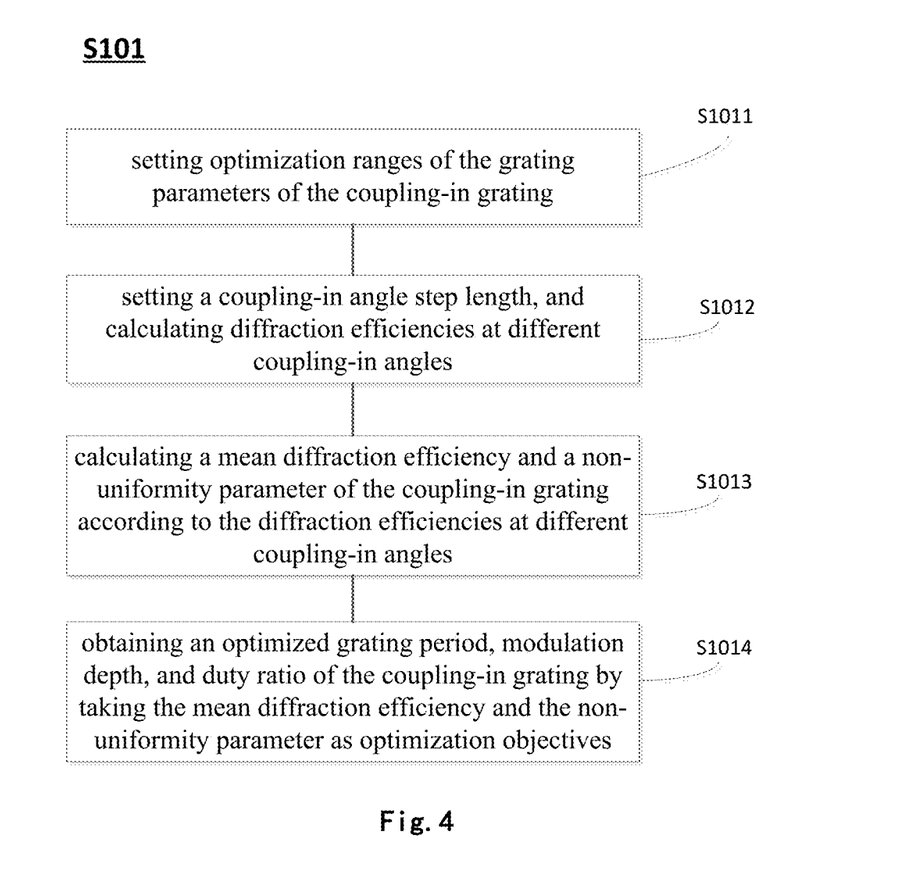
FIG. 4 illustrates optimization of a coupling-in grating in accordance with a preferred embodiment of the disclosure.

According to a preferred embodiment of the disclosure, as shown in FIG. 4, in the design method 10, the optimization of the grating parameters of the coupling-in grating in step S101 is achieved by the following method, including steps S1011-S1014.

In step S1011, optimization ranges of the grating parameters of the coupling-in grating are set.

The optimization ranges of the grating parameters are determined according to a wavelength of a light beam coupled into the AR optical waveguide 100. For example, as for green light, an optimization range of the grating period is 300 nm to 500 nm, an optimization range of the duty ratio is 30% to 70%, and considering that an aspect ratio of the grating ridge is no more than 2:1 due to a process limitation, an optimization range of the grating depth is 100 nm to 300 nm.

In step S1012, a coupling-in angle step length is set, and the diffraction efficiencies at different coupling-in angles are calculated.

The diffraction efficiencies at different coupling-in angles are calculated respectively. For example, the division of the coupling-in angles is based on a step length of 0.2°, and the light-emitting angle range of the optical machine 140 is assumed to be θ, and symmetric with respect to 0°, which is divided into m coupling-in angles in total, i.e., m=θ/0.2. The diffraction efficiency is recorded once every 0.2°, and recorded m times in total, and the diffraction efficiencies at different coupling-in angles are set as Ei, where i∈ (−θ/2, . . . −0.4, −0.2,0,0.2,0.4 . . . θ/2).

In step S1013, a mean diffraction efficiency and a non-uniformity parameter of the coupling-in grating are calculated according to the diffraction efficiencies at different coupling-in angles.

By means of designing various grating parameters of the coupling-in grating 110, a function of the +1st order diffraction efficiency with respect to the coupling-in angle is optimized, such that it is approximately uniformly distributed. However, it is also undesirable to improve only the uniformity of the +1st order diffraction efficiency and compromise the light extraction efficiency (characterized by a mean diffraction efficiency) of the coupling-in grating 110. Therefore, in a preferred embodiment of the disclosure, both the uniformity of the +1st order diffraction efficiency and the mean diffraction efficiency are taken as optimization objectives. Herein, the mean diffraction efficiency is:

$$E_{mean-efficiency} = \frac{\sum Ei}{m}$$

The non-uniformity parameter of the diffraction efficiency is:

$$E_{non-uniform} = \frac{Ei_{max} - Ei_{min}}{Ei_{max} + Ei_{min}}$$

In step S1014, an optimized grating period, modulation depth, and duty ratio of the coupling-in grating 110 are obtained by taking the mean diffraction efficiency and the non-uniformity parameter as optimization objectives.

The maximized mean diffraction efficiency $E_{mean-efficiency}$ and the minimized non-uniformity parameter $E_{non-uniform}$ are taken as optimization objectives, and a steepest descent (DS) method, a genetic algorithm (GA), particle swarm optimization (PSO) or simulated annealing (SA) algorithm are employed to optimize a grating period, modulation depth and duty ratio.

Figure 5:
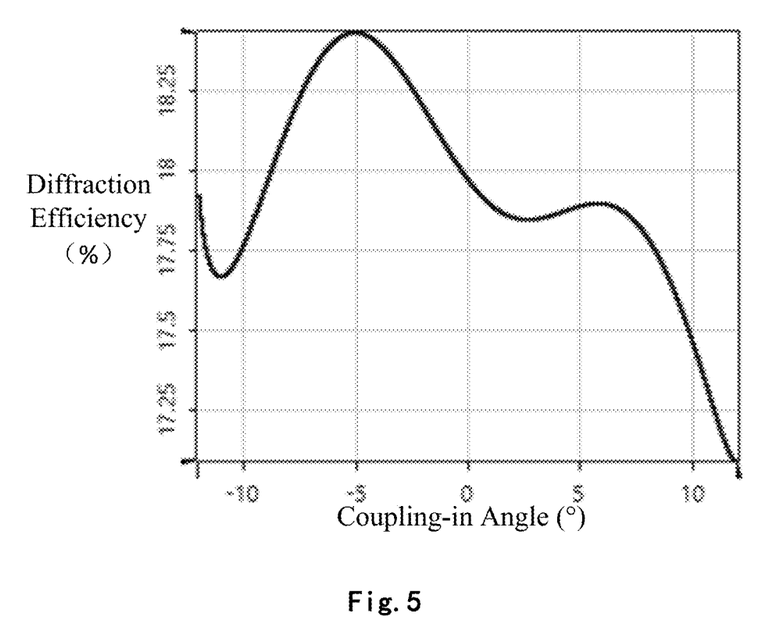
FIG. 5 illustrates a function of a diffraction efficiency of a coupling-in grating with respect to a coupling-in angle after optimization of the coupling-in grating in accordance with a preferred embodiment of the disclosure.

As shown in FIG. 5, a function of the diffraction efficiency of the optimized coupling-in grating 110 with respect to the coupling-in angle of the beam is obtained. If the optimized coupling-in grating 110 is employed, as shown in FIG. 1, the light beam L1 generated by the optical machine 140 is coupled into the AR optical waveguide 100 at an angle of −10°, and the light beam L2 generated by the optical machine 140 is coupled into the AR optical waveguide 100 at an angle of 10°. It can be known from FIG. 5 that the +1st order diffraction efficiency of the light beam L1 is 17.75%, and the +1st order diffraction efficiency of the light beam L2 is 17.5%. After the light beam L1 and the light beam L2 are propagated through the optical waveguide body 120, and coupled out by the coupling-out grating 130, the brightness of the image information transmitted by the light beam L1 and the brightness of the image information transmitted by the light beam L2 as observed by human eyes are not significantly different.

Figure 6:
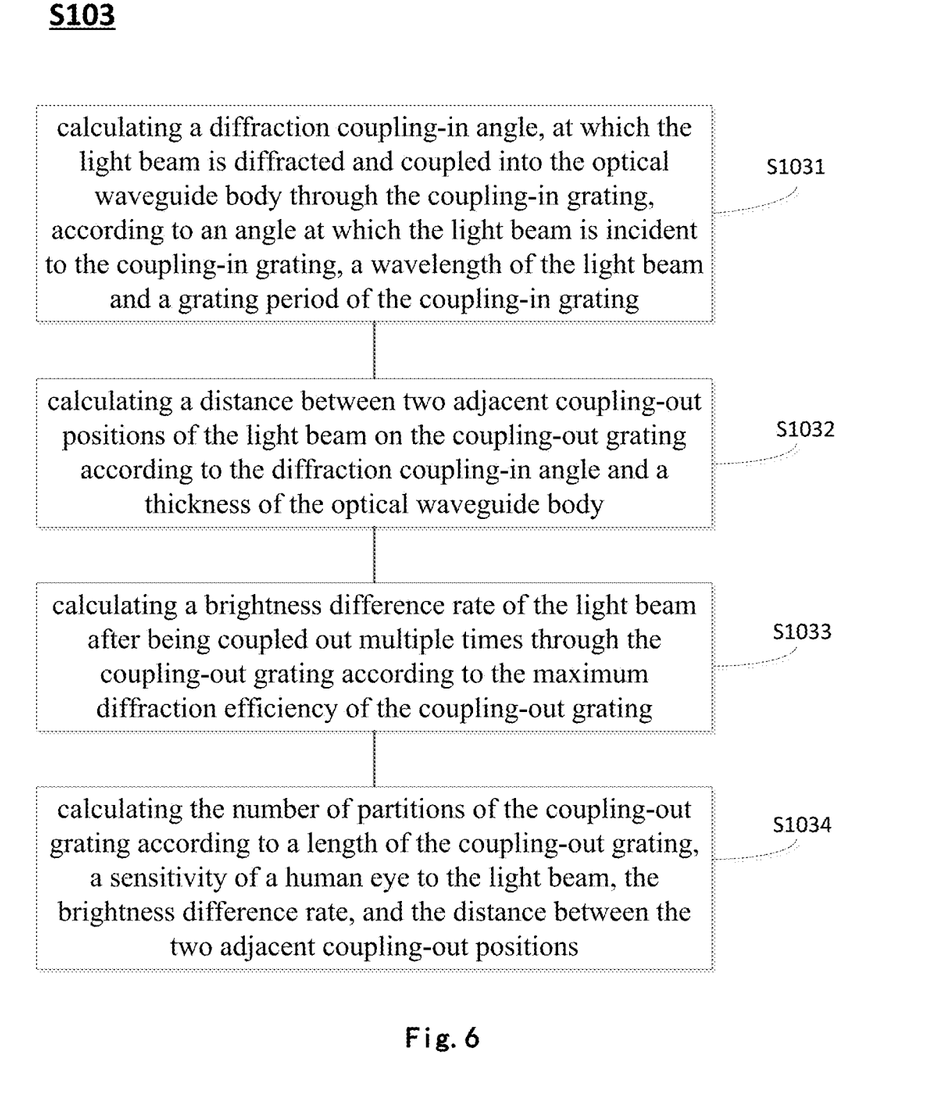
FIG. 6 illustrates partitioning of a coupling-out grating in accordance with a preferred embodiment of the disclosure.

According to a preferred embodiment of the disclosure, as shown in FIG. 6, in the design method 10, partitioning the coupling-out grating 130 in step S103 is achieved by the following method, including steps S1031 to S1034.

In step S1031, a diffraction coupling-in angle, at which the light beam is diffracted and coupled into the optical waveguide body 120 through the coupling-in grating 110, is calculated according to an angle at which the light beam is incident to the coupling-in grating 110, a wavelength of the light beam and a grating period of the coupling-in grating 110.

Figure 7:
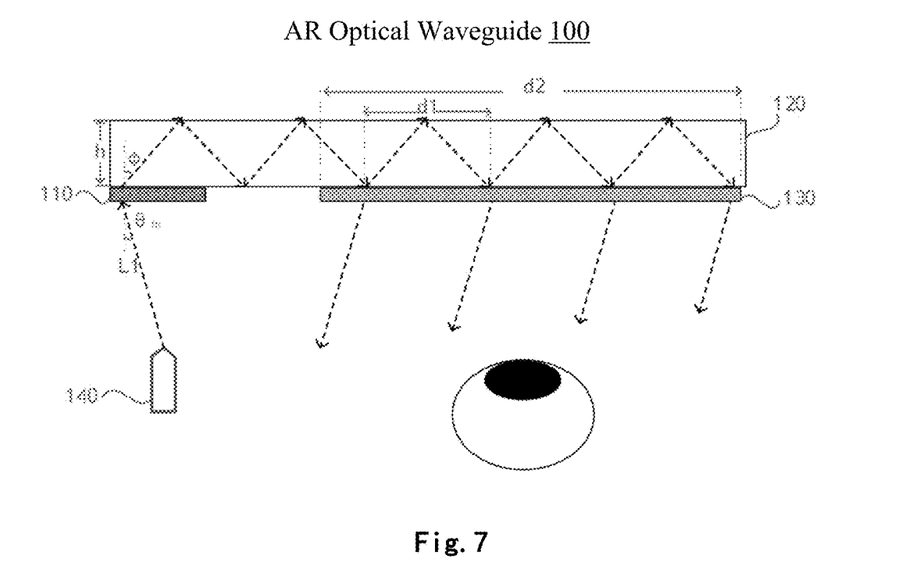
FIG. 7 illustrates various parameters of an optical waveguide body in accordance with a preferred embodiment of the disclosure.

As shown in FIG. 7, the light beam L1 emitted by the optical machine 140 is propagated in the optical waveguide body 120 by total reflection after being coupled into the AR optical waveguide 100 through the coupling-in grating 110, and a diffraction coupling-in angle φ of the light beam L1 is:

$$\varphi = \left(\frac{\lambda}{\Lambda} + \sin\theta_{in}\right)/n$$

where λ is a wavelength of the light beam L1, Λ is a grating period of the coupling-in grating 110, $\theta_{in}$ is an incident angle at which the light beam L1 is incident to the coupling-in grating 110, and n is a diffraction order.

In step S1032, a distance between two adjacent coupling-out positions of the light beam on the coupling-out grating 130 is calculated according to the diffraction coupling-in angle φ and a thickness of the optical waveguide body 120.

As shown in FIG. 7, assuming that a thickness of the optical waveguide body 120 is h, a distance between two adjacent coupling-out positions of the light beam in the coupling-out region of the coupling-out grating 130 is:

$$d1 = 2h * \tan \varphi$$

In step S1033, a brightness difference rate of the light beam after being coupled out multiple times through the coupling-out grating 130 is calculated according to the maximum diffraction efficiency of the coupling-out grating 130.

Assuming that the maximum diffraction efficiency of the coupling-out grating 130 is a, the mth light extraction efficiency is:

$$a_m = a(1-a)^{m-1}$$

A brightness difference rate between the pth coupling extraction and the mth coupling extraction is:

$$\Delta a = a((1-a)^{m-1} - (1-a)^{p-1})$$

Since the light beam attenuates most at the time of initial coupling-out in the course of propagation in the optical waveguide body 120, and assuming m=1, then $$\Delta a = a(1 - (1-a)^{p-1})$$

In step S1034, the number of partitions of the coupling-out grating 130 is calculated according to a length of the coupling-out grating 130, a sensitivity of a human eye to the light beam, the brightness difference rate Δa, and the distance d1 between the two adjacent coupling-out positions.

Assuming that the sensitivity of a human eye to the brightness of light of a fixed wavelength is Δb, under different light intensities, a coefficient α needs to be added for the sensitivity of the human eye to the brightness of light. In order to ensure that human eye does not perceive an obvious change in brightness when receiving light information, the brightness difference rate Δa<αΔb needs to be ensured, i.e.:

$$a(1-(1-a)^{p-1}) < \alpha \Delta b$$

As can be concluded from the formula listed above, under the premise that the change in brightness being not perceivable by the human eye is ensured, the times p of coupling out in one and the same partition of the coupling-out grating 130 is:

$$p < 1 - \sqrt[a]{1 - \frac{\alpha \Delta b}{a}} + 1$$

The coupling-out region of the coupling-out grating 130 is divided by the coupling-out times p, and in one and the same partition, the same grating parameters are employed, such that the brightness attenuation observed by a human eye is not obvious. In one and the same partition, if the maximum number of times of coupling-out is p, the length of the partition is p*d1, i.e., the product of the distance between the two adjacent coupling-out positions and the maximum number of times of coupling-out, and if the length of the coupling-out grating 130 is d2, the number of partitions on the coupling-out grating 130 is:

$$f = d2/(p*d1),$$

f is taken as an integer.

In different partitions, the diffraction efficiencies of different partitions are made different by adjusting a grating duty ratio or another grating parameter, and as a light beam is propagated by total reflection in the optical waveguide body 120, the optical intensity continuously attenuates. Therefore, the diffraction coupling-out efficiencies of respective partitions are set to be continuously improved in an optical propagation path, so as to compensate the brightness difference caused by the attenuation of the light intensity.

According to a preferred embodiment of the disclosure, in the design method 10, the light beam is incident as a conical light beam with a certain field angle, and the step S1031 described above further includes:

calculating a diffraction coupling-in angle φ according to a central incident angle of the conical light beam or a positive/negative extreme value of an incident angle of the conical light beam.

Figure 8:
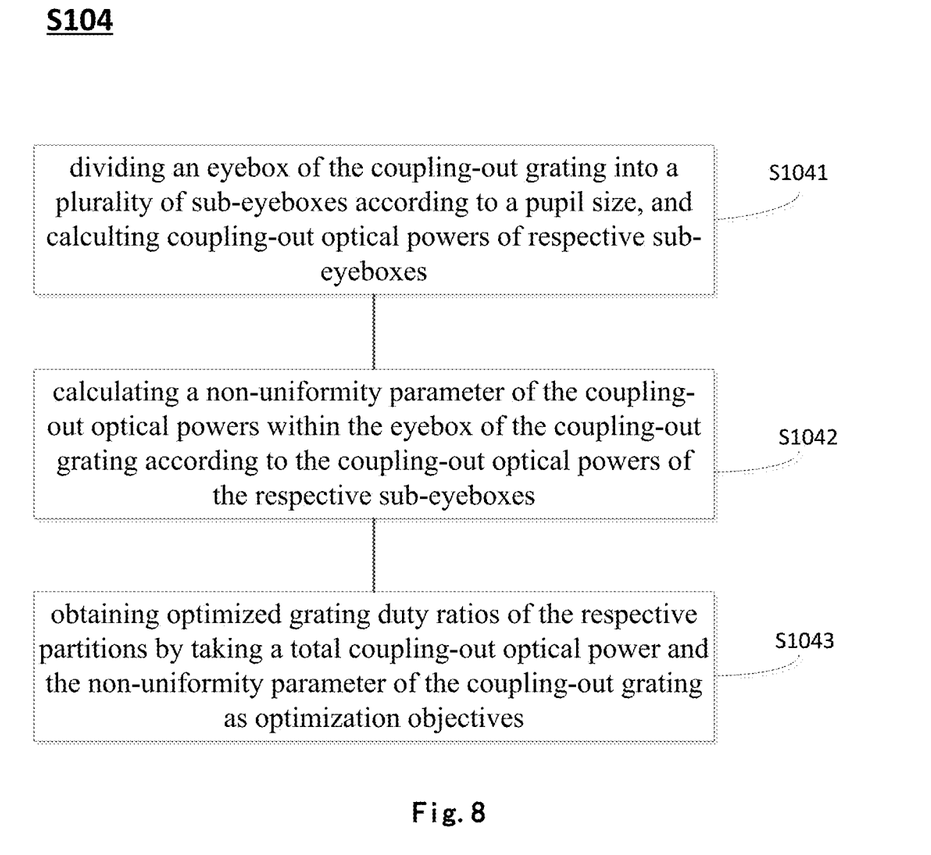
FIG. 8 illustrates optimization of a coupling-out grating in accordance with a preferred embodiment of the disclosure.

According to a preferred embodiment of the disclosure, as shown in FIG. 8, in the design method 10, the step S104 of obtaining grating duty ratios of respective partitions of the coupling-out grating 130 by taking a total coupling-out optical power and non-uniformity of the coupling-out grating 130 as optimization objectives is implemented by the following method, including steps S1041-S1043.

In step S1401, an eyebox of the coupling-out grating 130 is divided into a plurality of sub-eyeboxes according to a pupil size, and coupling-out optical powers of respective sub-eyeboxes are calculated.

Figure 9:
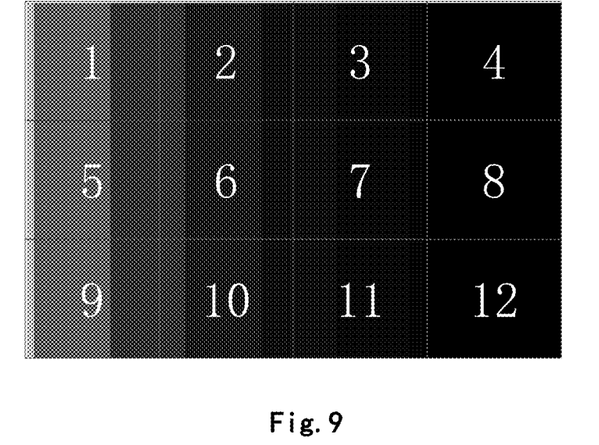
FIG. 9 illustrates division of an eyebox into a plurality of sub-eyeboxes according to a pupil size in accordance with a preferred embodiment of the disclosure.

As shown in FIG. 9, an eyebox of the coupling-out grating is divided into 12 sub-eyeboxes according to the pupil size, and the coupling-out optical powers Uj of respective sub-eyeboxes are calculated respectively, where j∈(1, 2, . . . 12).

In step S1042, a non-uniformity parameter of the coupling-out optical powers within the eyebox of the coupling-out grating 130 is calculated according to the coupling-out optical powers Uj of the respective sub-eyeboxes.

The non-uniformity parameter of the coupling-out optical powers within the eyebox is:

$$U_{non-uniform} = \frac{Uj_{max} - Uj_{min}}{Uj_{max} + Uj_{min}}$$

The total coupling-out optical power within the eyebox is:

$$U_{total} = \Sigma Uj$$

Since the output light intensity of the optical machine 140 is constant under normal conditions, the coupling efficiency of the AR optical waveguide 100 is consistent with the total coupling-out optical power of the coupling-out grating 130. In the preferred embodiment of the disclosure, the total coupling-out optical power of the coupling-out grating 130 and the non-uniformity of the coupling-out optical powers of respective sub-eyeboxes are taken as optimization objectives.

In step S1043, the total coupling-out optical power $U_{total}$ and the non-uniformity parameter $U_{non-uniform}$ of the coupling-out grating 130 are taken as optimization objectives to obtain optimized grating duty ratios of the respective partitions. Preferably, optimization is performed by employing a steepest descent method, genetic algorithm, particle swarm optimization or simulated annealing algorithm.

The design method 10 provided by the disclosure will be further introduced below through a specific embodiment.

Assuming that a sensitivity coefficient of a human eye is α=1, a sensitivity of the human eye to brightness under ambient light is Δb≈1:20=0.05. A thickness of the optical waveguide body 120 of the AR optical waveguide 100 is h=1 mm, a width of the coupling-out grating 130 is d2=23 mm, and refractive indexes of both the grating and the optical waveguide are 1.816.

As for green light, an optimization range of the grating period is 300 nm to 500 nm, an optimization range of the duty ratio is 30% to 70%, and considering that an aspect ratio of the grating ridge is no more than 2:1 due to a process limitation, an optimization range of the grating depth is 100 nm to 300 nm.

As the initial grating parameters, the grating period of the coupling-in grating 110 is 390 nm, the duty ratio is 50%, and the grating depth is 190 nm.

The division of coupling-in angles is based on a step length of 0.2°, and the steepest descent (DS) algorithm is employed to optimize optimization objectives.

It is obtained by means of the optimization that the mean diffraction efficiency of the coupling-in grating 110 converges between 10% and 20%, and the fluctuation interval of the non-uniformity coefficient is relatively large. The optimization results are analyzed, and the grating period, duty ratio and modulation depth are selected. The grating period is preferably 420 nm-450 nm, the modulation depth is preferably 160 nm-200 nm, and the duty ratio of the coupling-in grating 110 is preferably 44%-53%. The mean diffraction efficiency of the coupling-in grating 110 can reach 17%, and the non-uniformity coefficient is 3%.

It is obtained by means of the calculation that the maximum angle at which the total reflection occurs in the optical waveguide body 120 is φ=49.75°, the coupling-out grating 130 is partitioned by the method described above to obtain p=1.9, and the distance between the two adjacent coupling-out positions is d1=2.36 mm, then the number of partitions of the coupling-out grating 130 is f=23/(1.9*2.36), an integer being taken as f=5.

Within five partitions of the coupling-out grating 130, the grating periods and the modulation depths are the same as those of the coupling-in grating 110. The grating duty ratios within the five partitions of the coupling-out grating 130 serve as optimization variables, and the eyebox is divided according to the pupil size. Herein, the eyebox is 15 mm*10 mm, and the eyebox is divided into 4*3, totally 12 regions, and the optical power Uj is calculated within each region. The grating duty ratio fi inside each partition serves as an optimization variable, the total coupling-out optical power $U_{total}$ and the non-uniformity parameter $U_{non-uniform}$ of the coupling-out grating 130 serve as optimization objectives, and the particle swarm optimization (PSO) is used to optimize the objectives. It is obtained by means of the optimization that the non-uniformity of the optical powers within the eyebox gradually converges to 15%-20%. After analysis of the optimization results, the optimal optimization combination is obtained, and the obtained grating duty ratios fi are as shown in Table 1.

TABLE 1

| | Partition No. | | | | |
|---|---|---|---|---|---|
| | 1 | 2 | 3 | 4 | 5 |
| Duty Ratio fi within Partition | 0.31 | 0.291 | 0.42 | 0.32 | 0.68 |

Figure 10:
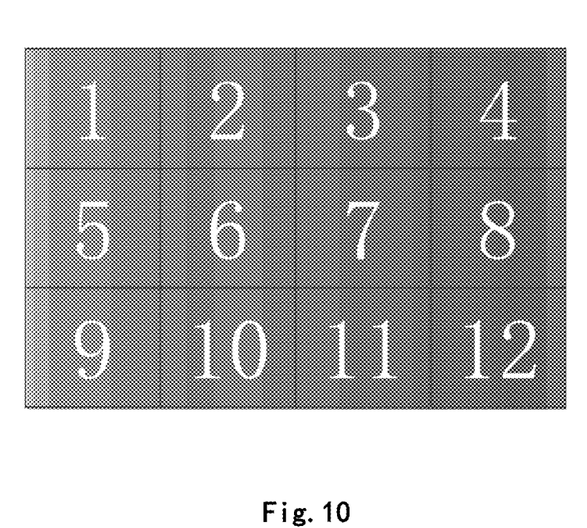
FIG. 10 illustrates a display effect after optimization of a coupling-in grating, partitioning of a coupling-out grating and optimization of a coupling-out grating in accordance with a preferred embodiment of the disclosure.

The optimized results are used for reconstructing a waveguide model and performing simulation, and the simulation result is as shown in FIG. 10. As can be seen, the uniformity of light is greatly improved within the range of an eyebox compared with the situation prior to the optimization as shown in FIG. 9.

According to a preferred embodiment of the disclosure, the disclosure also provides an optical waveguide for AR glasses, which is designed and manufactured by employing the design method 10 as described above.

A preferred embodiment of the disclosure provides a design method of a coupling-out grating of an AR optical waveguide. According to the parameters of the coupling-out grating and the optical waveguide, and the degree of sensitivity of a human eye to the brightness of a light beam, the coupling-out grating is partitioned, such that the human eye does not easily perceive a change in brightness in one and the same partition. As for different partitions, grating duty ratios in respective partitions are optimized, such that the coupling-out diffraction efficiencies of the respective partitions are different, thereby improving the situation where an image transmitted through the AR optical waveguide exhibits a change in brightness in the field of view of the wearer. A preferred embodiment of the disclosure further provides a design method of an AR optical waveguide. Various grating parameters of a coupling-in grating are optimized, such that the diffraction efficiencies of light beams coupled into the optical waveguide at different angles are close to each other. Within an eyebox of the coupling-out grating, grating duty ratios are optimized, such that the diffraction efficiencies of respective sub-eyeboxes are uniform, thereby further improving the situation of the non-uniformity in brightness of the displayed image as described above.

It should be noted finally that the contents described above are only preferred embodiments of the present disclosure, and are not used to limit the present disclosure. Although the detailed description of the present disclosure has been provided with reference to the foregoing embodiments, those skilled in the art may still make modifications to the technical solution as recited in each of the foregoing embodiments, or make equivalent replacements for some of the technical features therein. Any modification, equivalent replacement, or improvement, etc., made within the spirit and principles of the present disclosure, should be included in the protection scope of the present disclosure.

We claim:

1. A design method of a coupling-out grating of an augmented reality AR optical waveguide, the AR optical waveguide comprising a coupling-in grating, an optical waveguide body and the coupling-out grating, and the design method characterized by comprising: calculating a diffraction coupling-in angle, at which a light beam is diffracted and coupled into the optical waveguide body through the coupling-in grating, according to an angle at which the light beam is incident to the coupling-in grating, a wavelength of the light beam and a grating period of the coupling-in grating; calculating a distance between two adjacent coupling-out positions of the light beam on the coupling-out grating according to the diffraction coupling-in angle and a thickness of the optical waveguide body; calculating a brightness difference rate of the light beam after being coupled out multiple times through the coupling-out grating according to a maximum diffraction efficiency of the coupling-out grating; and calculating a number of partitions of the coupling-out grating according to a length of the coupling-out grating, a sensitivity of a human eye to the light beam, the brightness difference rate, and the distance between the two adjacent coupling-out positions.

2. The design method of claim 1, wherein the light beam is incident as a conical light beam with a certain field angle, the calculating the diffraction coupling-in angle further comprising:
calculating the diffraction coupling-in angle according to a central incident angle of the conical light beam or a positive/negative extreme value of an incident angle of the conical light beam.

3. A design method of an augmented reality AR optical waveguide, the AR optical waveguide comprising a coupling-in grating, an optical waveguide body, and a coupling-out grating, and the design method characterized by comprising: optimizing grating parameters of the coupling-in grating according to an angle at which a light bean is incident to the coupling-in grating and a wavelength of the light beam, the grating parameters comprising a grating period, a grating depth and a grating duty ratio; determining a grating period and a grating depth of the coupling-out grating according to the grating period and the grating depth of the coupling-in grating: partitioning the coupling-out grating by employing a design method of the coupling-out grating; and obtaining grating duty ratios of respective partitions of the coupling-out grating by taking a total coupling-out optical power and non-uniformity of the coupling-out grating as optimization objectives, wherein the design method of the coupling-out grating comprises: calculating a diffraction coupling-in angle, at which a light beam is diffracted and coupled into the optical waveguide body through the coupling-in grating, according to an angle at which the light beam is incident to the coupling-in grating, a wavelength of the light beam and a grating period of the coupling-in grating; calculating a distance between two adjacent coupling-out positions of the light beam on the coupling-out grating according to the diffraction coupling-in angle and a thickness of the optical waveguide body; calculating a brightness difference rate of the light beam after being coupled out multiple times through the coupling-out grating according to a maximum diffraction efficiency of the coupling-out grating; and calculating a number of partitions of the coupling-out grating according to a length of the coupling-out grating, a sensitivity of a human eye to the light beam, the brightness difference rate, and the distance between the two adjacent coupling-out positions.

4. The design method of claim 3, wherein the optimizing grating parameters of the coupling-in grating further comprises:
determining optimization ranges of the grating parameters according to initial grating parameters and the wavelength of the light beam;
calculating diffraction efficiencies at different coupling-in angles according to a maximum diffraction coupling-in angle and a set coupling-in angle step length;
calculating a mean diffraction efficiency and a non-uniformity parameter of the coupling-in grating according to the diffraction efficiencies at different coupling-in angles; and
obtaining an optimized grating period, modulation depth, and duty ratio of the coupling-in grating by taking the mean diffraction efficiency and the non-uniformity parameter as optimization objectives.

5. The design method of claim 4, wherein the obtaining the optimized grating period, the modulation depth, and the duty ratio further comprises: performing optimization by employing a steepest descent method, genetic algorithm, particle swarm optimization or simulated annealing algorithm.

6. The design method of claim 5, wherein the determining a grating period and a grating depth further comprises:
designing the coupling-out grating to have a grating depth and grating period consistent with those of the coupling-in grating.

7. The design method of claim 5, wherein the obtaining grating duty ratios further comprises:
dividing an eyebox of the coupling-out grating into a plurality of sub-eyeboxes according to a pupil size, and calculating coupling-out optical powers of respective sub-eyeboxes;
calculating a non-uniformity parameter of the coupling-out optical powers within the eyebox of the coupling-out grating according to the coupling-out optical powers of the respective sub-eyeboxes;
obtaining optimized grating duty ratios of the respective partitions by taking the total coupling-out optical power and the non-uniformity parameter of the coupling-out grating as optimization objectives.

8. The design method of claim 7, wherein the obtaining optimized grating duty ratios further comprises:
performing optimization by employing a steepest descent method, genetic algorithm, particle swarm optimization or simulated annealing algorithm.

9. The design method of claim 4, wherein the determining a grating period and a grating depth further comprises:
designing the coupling-out grating to have a grating depth and grating period consistent with those of the coupling-in grating.

10. The design method of claim 4, wherein the obtaining grating duty ratios further comprises:
dividing an eyebox of the coupling-out grating into a plurality of sub-eyeboxes according to a pupil size, and calculating coupling-out optical powers of respective sub-eyeboxes;
calculating a non-uniformity parameter of the coupling-out optical powers within the eyebox of the coupling-out grating according to the coupling-out optical powers of the respective sub-eyeboxes;
obtaining optimized grating duty ratios of the respective partitions by taking the total coupling-out optical power and the non-uniformity parameter of the coupling-out grating as optimization objectives.

11. The design method of claim 10, wherein the obtaining optimized grating duty ratios further comprises:
performing optimization by employing a steepest descent method, genetic algorithm, particle swarm optimization or simulated annealing algorithm.

12. The design method of claim 3, wherein the determining the grating period and the grating depth further comprises:

designing the coupling-out grating to have a grating depth and grating period consistent with those of the coupling-in grating.

13. The design method of claim 3, wherein the obtaining grating duty ratios further comprises:
dividing an eyebox of the coupling-out grating into a plurality of sub-eyeboxes according to a pupil size, and calculating coupling-out optical powers of respective sub-eyeboxes;
calculating a non-uniformity parameter of the coupling-out optical powers within the eyebox of the coupling-out grating according to the coupling-out optical powers of the respective sub-eyeboxes;
obtaining optimized grating duty ratios of the respective partitions by taking the total coupling-out optical power and the non-uniformity parameter of the coupling-out grating as optimization objectives.

14. The design method of claim 13, wherein the obtaining optimized grating duty ratios further comprises:
performing optimization by employing a steepest descent method, genetic algorithm, particle swarm optimization or simulated annealing algorithm.

15. The design method of claim 3, wherein the light beam is incident as a conical light beam with a certain field angle, the calculating the diffraction coupling-in angle further comprising:
calculating the diffraction coupling-in angle according to a central incident angle of the conical light beam or a positive/negative extreme value of an incident angle of the conical light beam.

16. An optical waveguide for augmented reality AR glasses, designed and manufactured by employing the design method the AR optical waveguide comprising a coupling-in grating, an optical waveguide body, and a coupling-out grating, and the design method comprising: optimizing grating parameters of the coupling-in grating according to an angle at which alight beam is incident to the coupling-in grating and a wavelength of the light beam, the grating parameters comprising a grating period, a grating depth and a grating duty ratio; determining a grating period and a grating depth of the coupling-out grating according to the grating period and the grating depth of the coupling-in grating; partitioning the coupling-out grating by employing a design method of the coupling-out grating; and obtaining grating duty ratios of respective partitions of the coupling-out g rating by taking a total coupling-out optical power and non-uniformity of the coupling-out grating as optimization objectives, wherein the design method of the coupling-out grating comprises: calculating a diffraction coupling-in angle, at which a light beam is diffracted and coupled into the optical waveguide body through the coupling-in grating, according to an angle at which the light beam is incident to the coupling-in grating, a wavelength of the light beam and a grating period of the coupling-in grating; calculating a distance between two adjacent coupling-out positions of the light beam on the coupling-out grating according to the diffraction coupling-in angle and a thickness of the optical waveguide body; calculating a brightness difference rate of the light beam after being coupled out multiple times through the coupling-out grating according to a maximum diffraction efficiency of the coupling-out grating; and calculating a number of partitions of the coupling-out grating according to a length of the coupling-out grating, a sensitivity of a human eye to the light beam, the brightness difference rate, and the distance between the two adjacent coupling-out positions.

17. The optical waveguide for AR glasses of claim 16, wherein the optimizing grating parameters of the coupling-in grating further comprises:
determining optimization ranges of the grating parameters according to initial grating parameters and the wavelength of the light beam;
calculating diffraction efficiencies at different coupling-in angles according to a maximum diffraction coupling-in angle and a set coupling-in angle step length;
calculating a mean diffraction efficiency and a non-uniformity parameter of the coupling-in grating according to the diffraction efficiencies at different coupling-in angles; and
obtaining an optimized grating period, modulation depth, and duty ratio of the coupling-in grating by taking the mean diffraction efficiency and the non-uniformity parameter as optimization objectives.

18. The optical waveguide for AR glasses of claim 17, wherein the obtaining the optimized grating period, modulation depth, and duty ratio further comprises:
performing optimization by employing a steepest descent method, genetic algorithm, particle swarm optimization or simulated annealing algorithm.

19. The optical waveguide for AR glasses of claim 16, wherein the determining the grating period and the grating depth further comprises:
designing the coupling-out grating to have a grating depth and grating period consistent with those of the coupling-in grating.

20. The optical waveguide for AR glasses of claim 16, wherein the obtaining grating duty ratios further comprises:
dividing an eyebox of the coupling-out grating into a plurality of sub-eyeboxes according to a pupil size, and calculating coupling-out optical powers of respective sub-eyeboxes;
calculating a non-uniformity parameter of the coupling-out optical powers within the eyebox of the coupling-out grating according to the coupling-out optical powers of the respective sub-eyeboxes;
obtaining optimized grating duty ratios of the respective partitions by taking the total coupling-out optical power and the non-uniformity parameter of the coupling-out grating as optimization objectives.

\* \* \* \* \*